United States Patent [19]
Rainer

[11] Patent Number: 5,597,850
[45] Date of Patent: *Jan. 28, 1997

[54] SPONGE FOR THE ABSORPTION OF METAL IONS

[76] Inventor: Norman B. Rainer, 2008 Fondulac Rd., Richmond, Va. 23229

[*] Notice: The portion of the term of this patent subsequent to Mar. 26, 2008, has been disclaimed.

[21] Appl. No.: 561,006

[22] Filed: Jul. 31, 1990

[51] Int. Cl.⁶ ........................................... C08J 5/20
[52] U.S. Cl. ................................ 521/29; 521/25; 521/28; 521/32
[58] Field of Search .................................. 521/25, 28, 29, 521/32; 524/36; 527/312; 525/417

[56] References Cited

U.S. PATENT DOCUMENTS

| | | | |
|---|---|---|---|
| 3,715,339 | 2/1973 | Rainer | 528/312 |
| 4,332,916 | 6/1982 | Thill | 521/25 |
| 5,002,984 | 3/1991 | Rainer | 524/30 |

*Primary Examiner*—Fred Zitomer
*Attorney, Agent, or Firm*—Norman B. Rainer

[57] ABSTRACT

An open-celled cellulosic sponge contains a thermally insolubilized polyethyleneimine (PEI) capable of selectively removing dissolved ions from aqueous systems. By virtue of a cuboid configuration of critically selected dimensions, the insolubilized PEI is substantially uniformly distributed in useful amounts throughout the sponge.

4 Claims, No Drawings

SPONGE FOR THE ABSORPTION OF METAL IONS

BACKGROUND OF THE INVENTION

1. Field of the Invention

This invention concerns an open-celled cellulosic sponge containing a water-insoluble polymer capable of selectively removing dissolved ions from aqueous systems.

2. Description of the Prior Art

The use of ion exchange resins for the absorption of dissolved ions is well known. Such resins are generally manufactured in bead form and are utilized in columns through which liquids are passed to interact with the beads. The beads are generally made of cross-linked polystyrene which is then chemically modified. Two chemical modifications of such resins are prevalent, namely: a resin having sulfonic acid groups and capable of exchanging positively charged ions (cations), and a resin having quaternary ammonium groups and capable of exchanging negatively charged ions (anions). Except for their selectivity for either cations or anions, such resins do not generally distinguish between different kinds of cations or anions as may be found in multi-component solute mixtures.

An ion exchange resin attached to an open-celled cellulose sponge is described in U.S. Pat. No. 4,332,916. Because such product is self-supporting and of potentially large size, it can be confined in retention means other than columns, and is substantially unaffected by water-borne suspended matter. In view of its physical characteristics, it is eminently suited for the treatment of flowing natural waters where high flow volumes and high sediment levels are encountered. The ion exchange resin of U.S. Pat. No. 4,332,916 is essentially a cation exchange resin chemically bonded to the hydroxyl groups of the cellulose of the sponge by means of a cross linking agent. Such bonding is accomplished at the relatively low temperature of 110 degrees C.

U.S. patent application Ser. No. 395,535, filed Aug. 18, 1989 U.S. Pat. No. 5,002,984 discloses an insolubilized polyethyleneimine (PEI) polymer deposited in situ within an open celled cellulosic sponge. The insolubilized PEI is generated by initially forming a water solution of PEI and an insolubilizing co-reactant, applying said solution to a cellulosic sponge, drying the treated sponge to remove water of solution, then curing the sponge at temperatures in the range of 130 degrees C. to 165 degrees C. The resultant insolubilized PEI is found to exhibit a unique mode of function wherein ions are absorbed based upon formation of a coordination complex involving repeating ethyleneamine units of the PEI.

It has been found however, that the relatively high temperatures and prolonged heating times of 20 to 80 minutes required to produce the insolubilized PEI cause thermal decomposition and oxidative degradation of the polymer and cellulose. It has also been found that treated sponges generally have a high loading of polymer in the peripheral regions, but have little or no polymer in the center region of the sponge. When the usual corrective measures were explored to remedy said problems, the resultant sponges had an unacceptably low add-on of less than 15% of polymer. When sponges of said Patent Application, prepared in sizes determined by commercially available sizes of cellulosic sponges, were utilized as a column packing to treat water, deformation of the sponges occurred, producing excessive impedance of flow. Although the metal-laden sponges may be eluted and re-used, or disposed of by incineration, it is sometimes desirable to dispose of the sponges in other ways. It has been found that the sponges of relatively large size were difficult to elute or burn, and were not readily amenable to other disposal routes.

It is accordingly an object of the present invention to provide a water-treating product comprised of an open-celled cellulosic sponge containing insolubilized polyethylenemine.

It is a further object of this invention to provide a water-treating product as in the foregoing object wherein said insolubilized polyethyleneimine is substantially uniformly distributed throughout the sponge.

It is a another object of the present invention to provide a product of the aforesaid nature which can be employed in a column configuration without undergoing deformation with attendant causation of increased impedance to flow of water.

It is a still further object of this invention to provide a product of the aforesaid nature having a content of insolubilized polyethyleneimine of at least 15%.

It is yet another object of the present invention to provide a product of the aforesaid nature readily amenable to disposal by compression techniques These objects and other objects and advantages of the invention will be apparent from the following description.

SUMMARY OF THE INVENTION

The above and other beneficial objects and advantages are accomplished in accordance with the present invention by a water-treating product comprised of an open celled sponge comprised of continuously interconnected cellulosic material having durably associated therewith between 15% and 60% by weight of said product of thermally insolubilized PEI, said sponge having a cuboid configuration comprised of a primary pair of parallel flat surfaces spaced apart by a distance representing an X axis having a length between 10 and 35 mm, and joined by a sidewall perimeter orthogonally disposed to said primary flat surfaces and causing said sponge to have at least one plane of symmetry perpendicular to said primary surfaces and including the X axis, the shortest straight line distance spanning said perimeter while perpendicularly intersecting said X axis being considered to be a Y axis, and the longest straight line distance spanning said perimeter while perpendicularly intersecting said X axis being considered to be a Z axis, the sum of the X and Y axes being less than 70 mm. In preferred embodiments, the sum of the X and Y axes is in the range of 20–50 mm, and the Z axis is preferably less than eight times the X axis.

DESCRIPTION OF THE PREFERRED EMBODIMENT

Suitable sponge for use in the practice of this invention is an open celled sponge whose cell wall interconnective or pellicular material is comprised of regenerated cellulose. Such sponges are generally manufactured by the heat treatment of a confined mixture of granular sodium sulfate decahydrate and "green" viscose. The heat treatment coagulates and regenerates the cellulose while also melting away the sodium sulfate. The resultant product is produced in slab form having flat parallel upper and lower primary surfaces. The slab is then cut in a rectilinear pattern to produce cuboid sponges having an elongated rectangular configuration. Varieties of cellulosic sponges suitable for general household use are produced by the Spontex Company of Columbia, TN and O-Cel-O Company of Tonawanda, N.Y. The sponges are typically available in the following dimensions (expressed in millimeters) wherein the commonly used length, width and thickness designations correspond to the aforesaid Z, Y, and X axes, respectively:

| Z | Y | X |
|---|---|---|
| 119 | 79 | 16 |
| 121 | 76 | 17 |
| 137 | 83 | 17 |
| 159 | 86 | 25 |
| 162 | 92 | 25 |
| 192 | 106 | 43 |
| 197 | 108 | 41 |

None of said commonly available sponge sizes are useful in the practice of the present invention. Even though some of said sponges have an X axis length between 10 and 35 mm, the sum of the X and Y axes in each case exceeds 70 mm.

The PEI useful in the practice of the present invention has a molecular weight in the range of 1800–60,000 and is marketed by BASF Corp. of Parisippany, N.J., and Hoechst Celanese Company of Somerville, N.J. The PEI, regardless of molecular weight, is soluble in water.

Insolubilization of the PEI is achieved by causing polyfunctional reactants to crosslink with the recurring amine groups of the PEI, having the formula:

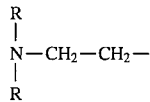

wherein R is a member selected from the group consisting of hydrogen and —$CH_2$—$CH_2$—NRR. The amino nitrogens of said recurring amine groups are accordingly primary, secondary or tertiary amine groups, the primary amine groups representing terminal groups of the polymer. Typical crosslinking species include polyfunctional isocyanates, esters, carboxylic acids and their anhydrides, and organic halogen compounds. The preferred crosslinking agents are polycarboxylic acids, which initially form a water-soluble amine salt with PEI and then, upon heating split off a molecule of water to form an amide link with each affected recurring amine group. The stoichiometry concerning the ratio of PEI to the number of reactive cross-linking functional groups may vary over a wide range. However, crosslinking of at least 15% of the recurring amine groups of the PEI is generally required to achieve insolubilization. Regardless of the specific cross-linking agent employed, the insolubilization of the PEI is achieved by heat applied to a sponge containing said PEI and other appropriate ingredients.

In the case of the use of the preferred polycarboxylic acid cross-linking agents, an aqueous precursor solution is first formed comprising PEI and cross-linking agent. The precursor solution is then employed to impregnate a suitable cellulosic sponge. In an initial stage of heating, the water of solution is removed from the sponge. The dried sponge is then subjected to a curing temperature in the range of 130 degrees C. to 165 degrees C. in order to transform the amine salt groups to covalent amide bonds. Following the curing thermal treatment, the sponge product is washed with water to remove soluble residues.

It has been found that, during heating at the curing temperature, there is a considerable thermal gradient between the surface of a given piece of sponge and its interior. It has also been found that the same thermal conditions required to generate amide bonds produce thermal decomposition of the PEI and cellulose. Accordingly, the dimensions of a given piece of treated sponge have been found to be of critical importance. The expedient of merely having one small uniform dimension, such as the aforesaid X axis has been found not to overcome the thermal gradient problem. If the sponge pieces are made very small in order to overcome thermal gradient effects, the advantage of the sponge format is diminished. For example, sponges having a one inch cube configuration can be easily retained by fish-net structures of tubular format, and will permit easy passage of sediment-laden water through the confined multitude of sponges while performing efficient absorption of metal ions. Very small sized sponges become more difficult to retain in fish-net structures, impede passage of water, and produce undesired accumulation of sediment from the water.

In order to determine the amounts of insolubilized PEI at different locations within a single piece of sponge product, pieces are carefully excised and subjected to analysis for total nitrogen content. A suitable method of nitrogen determination is the classic Kjeldahl method. The nitrogen value found for the sponge product is compared with the nitrogen value for the cross-linked PEI produced in the absence of the sponge by the same thermal treatment.

A further understanding of my invention will be had from a consideration of the following examples which illustrate certain preferred embodiments. All parts and percentages are by weight unless otherwise indicated. It is understood that the instant invention is not to be construed as being limited by said examples or by the details therein.

EXAMPLE 1

7.5 parts of nitrilotriacetic acid were mixed with 6.0 parts PEI having a molecular weight of about 1800 and 25 parts deionized water at 50 degrees C. to produce a homogeneous precursor solution having a pH of 6.8.

Individual pieces of open celled sponge of regenerated cellulose and having a rectangular perimeter and dimensions as shown in Table 1 below were saturated with the precursor solution and then squeezed between rollers to produce a damp sponge having about 145% add-on of precursor solution. The damp sponge was then heated at 155 degrees C. for 35 minutes. The resultant sponge was washed with water, dried at 110 degrees C., and allowed to equilibrate in a conditioning chamber at 24 degrees C. and 60% relative humidity. The final dimensions of the sponge are substantially the same as the dimensions of the sponge prior to treatment.

The geometric center of the sponge was excised with a scalpel blade and subjected to % N analysis along with a comparable volume piece of the sponge removed from one of its surfaces. A sample of the precursor solution was dried in a beaker, cured under the same thermal conditions employed for the sponge then powdered, washed, and dried The % N of the resultant insolubilized PEI polymer was found to be 27.34% by Kjeldahl method. The distribution of insolubilized PEI between the surface and center of the sponge is expressed in Table 1 as % insolubilized PEI polymer based upon the total weight of the polymer-laden sponge.

TABLE 1

| Sample | Sponge Dimensions (mm) | | | Insolubilized PEI (%) | |
|---|---|---|---|---|---|
| Designation | X Axis | Y Axis | Z Axis | Center | Surface |
| A | 15 | 20 | 20 | 27 | 29 |
| B | 15 | 25 | 25 | 23 | 26 |
| C | 15 | 30 | 30 | 20 | 27 |
| D | 15 | 35 | 35 | 18 | 26 |
| E | 20 | 20 | 20 | 25 | 28 |
| F | 20 | 25 | 25 | 17 | 26 |
| G | 20 | 30 | 30 | 17 | 27 |
| H | 20 | 35 | 35 | 16 | 26 |
| I | 25 | 25 | 25 | 16 | 26 |
| J | 25 | 35 | 35 | 15 | 28 |
| K | 25 | 45 | 45 | 11 | 29 |
| L | 30 | 30 | 30 | 17 | 29 |

As the data of Table 1 indicate, whereas the polymer content at the surface of the sponges remains reasonably constant, the polymer content at the center varies considerably. The uniformity of distribution of insolubilized PEI between the center and periphery of the sponge is excellent in samples A, B and E where the sume of X+Y is no higher than 40 mm. When the sum of X+Y exceeds 60 mm, as in sample K, the sponge product becomes highly non-uniform. The consequences of this are twofold: the sponge product has less capacity for the absorption of ions, and a greater quantity of solute finds it way into the wash water, causing significant disposal problems. The sponge product made in this Exmaple is capable of removing metal contaminants such as copper, cadmium, iron, nickel and cobalt from acid mine drainage waters.

EXAMPLE 2

A precursor solution was prepared from 9.0 parts PEI having a molecular weight of about 40,000, 25 parts of deionized water, and sufficient glutaric acid to produce a solution having a pH of 7.2.

One hundred identical pieces were cut from a sheet of open celled regenerated cellulosic sponge having a thickness of 15 mm. In separate experiments, the perimeter, comprised of four straight sides defining either a rectangle or trapezoidal parallelogram, was varied with respect to the Y and Z axes. The sponges of each experiment were saturated with the precursor solution and then squeezed between rollers to produce a damp sponge having about 235% add-on of precursor solution. The damp sponges were heated in a rotating drum oven maintained at 110 degrees C. until dry. The temperature in the oven was then elevated to a curing temperature of 158 degrees C., and rotation was continued until the sponges, initially white, became dark brown in color. The sponges at this point are extremely brittle, and mechanical degradation and breakage occurs to various degrees within the drum.

The resultant sponges were washed with water until a clear effluent is produced, and dried. The sponges were then examined to determine the number of sponges broken or otherwise severely damaged by virtue of the rotational treatment in the oven drum. The results found are reported in Table 2 below. The sponges have an average polymer content of 56%.

TABLE 2

| Sample | Sponge Dimensions (mm) | | | Number of Damaged |
|---|---|---|---|---|
| Designation | X Axis | Y Axis | Z Axis | Pieces |
| A | 15 | 20 | 20 | 0 |
| B | 15 | 20 | 40 | 4 |
| C | 15 | 20 | 60 | 11 |
| D | 15 | 25 | 80 | 17 |
| E | 15 | 25 | 100 | 23 |
| F | 15 | 25 | 120 | 65 |

The data of Table 2 indicate that, as the Z axis becomes longer, mechanical degradation of the sponges increased during the curing cycle in the rotating drum. Although the rotating drum provides a very uniform heat treatment of the sponges in comparison with other heating methods that might be employed, when the Z axis becomes eight times the X axis, the sponge becomes excessively susceptible to breakage. The long sized sponges are also difficult to pack into an absorption column to form a uniform bed. Also, when loaded into tubular fish nets that are disposed transversely across the bottom of a flowing river, the longer sponges cause greater impedance to water flow, placing greater stress on the tubular fish net.

EXAMPLE 3

Sponge designated sample A from Example 1, following use in the treatment of acid mine drainage water, was deposited upon a moving belt, and spray-treated with an aqueous urea-formaldehyde solution containing an acidic catalyst. A rake device adjusted the height of the bed of sponges to 4 inches. The substantially uniformly thick bed of sponges was passed through heated rollers to produce a preliminary partially dried cohesive slab product. The preliminary slabs were then cut transversely to their direction of motion and individually transferred to the lower heated platen of a hydraulic press. An upper platen was brought down upon the slab with a force of 50 tons pressure. Both platens of the press are maintained at a temperature of 300 degrees F., and compressive force is maintained for 7 minutes. The resulting product is a strong board, about ⅜ inch thick. The board is water-resistant, paintable, and eminently suited for use as a construction product. In those instances where the absorbed ions are radioactive, the compacted boards are well suited for underground storage. Sponges having dimensions outside the range of the product of the present invention are not amenable to board formation in the manner of this example.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A product comprised of an open celled sponge comprised of continuously interconnected cellulosic material having durably associated therewith between 15% and 60% by weight of said product of thermally insolubilized polyethyleneimine (PEI) derived from the interaction of PEI with a polycarboxylic acid, said sponge having a cuboid configuration comprised of a primary pair of parallel flat surfaces spaced apart by a distance representing an X axis having a length between 10 and 35 mm, and joined by a sidewall perimeter comprised of four sides orthogonally disposed to said primary flat surfaces and causing said sponge to have at least one plane of symmetry perpendicular to said primary surfaces and including the X axis, the shortest straight line distance spanning said perimeter while perpendicularly intersecting said X axis being considered to be a Y axis, and the longest straight line distance spanning said perimeter while perpendicularly intersecting said X axis being considered to be a Z axis, the sum of the X and Y axes being in the range of 20–50 mm, said Z axis being between one and eight times the X axis and less than 119 mm.

2. The product of claim 1 wherein said perimeter is comprised of four straight sides.

3. The product of claim 2 wherein said perimeter is rectangular.

4. The product of claim 4 wherein said polycarboxylic acid is nitrilotriacetic acid.

* * * * *